(12) United States Patent
Chan et al.

(10) Patent No.: US 10,746,947 B2
(45) Date of Patent: Aug. 18, 2020

(54) ELECTROMAGNETIC INTERFERENCE LEAKAGE REDUCTION FOR A PLUGGABLE OPTICAL MODULE

(71) Applicant: Lumentum Operations LLC, Milpitas, CA (US)

(72) Inventors: Kit Chan, Hongkong (CN); Jeffy Lu, Dongguan of Guangdong (CN); Lynn Wang, Guangdong (CN)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 16/450,762

(22) Filed: Jun. 24, 2019

(65) Prior Publication Data
US 2020/0041738 A1 Feb. 6, 2020

(30) Foreign Application Priority Data
Jul. 31, 2018 (WO) ................ PCT/CN2018/097798

(51) Int. Cl.
*G02B 6/42* (2006.01)
*H01R 13/627* (2006.01)
*G02B 6/38* (2006.01)

(52) U.S. Cl.
CPC ......... *G02B 6/4261* (2013.01); *G02B 6/3821* (2013.01); *G02B 6/3825* (2013.01); *G02B 6/3893* (2013.01); *G02B 6/4277* (2013.01); *H01R 13/6275* (2013.01)

(58) Field of Classification Search
None
See application file for complete search history.

(56) References Cited

U.S. PATENT DOCUMENTS

| 6,524,134 B2 | 2/2003 | Flickinger et al. |
| 6,994,478 B1 | 2/2006 | Chiu et al. |
| 8,636,544 B1 | 1/2014 | Briant et al. |
| 2003/0171033 A1* | 9/2003 | Bright .................. G02B 6/4201 439/607.25 |
| 2005/0152701 A1 | 7/2005 | Liu et al. |
| 2005/0286837 A1 | 12/2005 | Oki et al. |
| 2008/0232758 A1 | 9/2008 | Miyoshi et al. |

(Continued)

FOREIGN PATENT DOCUMENTS

| CN | 202196202 U | 4/2012 |
| CN | 202975404 U | 6/2013 |

(Continued)

OTHER PUBLICATIONS

International Search Report and Written Opinion for Application No. PCT/CN2018/097798, dated Apr. 28, 2019, 8 pages.

*Primary Examiner* — Chad H Smith
(74) *Attorney, Agent, or Firm* — Harrity & Harrity, LLP

(57) ABSTRACT

A pluggable optical module may include a housing enclosing one or more optical components and one or more electrical components. The pluggable optical module may include a slider to move along an exterior wall of the housing in association with latching or unlatching the pluggable optical module. The pluggable optical module may include an electromagnetic interference (EMI) shield arranged in a gap between the slider and the exterior wall of the housing such that the EMI shield contacts the slider and the exterior wall of the housing. The EMI shield reduce EMI radiation passing through the gap.

20 Claims, 6 Drawing Sheets

(56) References Cited

U.S. PATENT DOCUMENTS

| | | | |
|---|---|---|---|
| 2008/0247762 A1 | 10/2008 | Yoshikawa et al. | |
| 2008/0315528 A1* | 12/2008 | Moore | G02B 6/4246 277/314 |
| 2014/0104808 A1* | 4/2014 | Koutrokois | G02B 6/4246 361/818 |
| 2015/0125119 A1 | 5/2015 | Droesbeke | |
| 2015/0162709 A1 | 6/2015 | Shen | |
| 2017/0131493 A1 | 5/2017 | Koutrokois | |
| 2017/0168249 A1* | 6/2017 | Maeda | G02B 6/4206 |

FOREIGN PATENT DOCUMENTS

| | | |
|---|---|---|
| CN | 104412140 A | 3/2015 |
| CN | 104838300 A | 8/2015 |
| JP | 2003124011 A | 4/2003 |
| JP | 2008102543 A | 5/2008 |
| JP | 2008233645 A | 10/2008 |
| JP | 2008257235 A | 10/2008 |
| JP | 2008310066 A | 12/2008 |
| JP | 2009258463 A | 11/2009 |
| JP | 2009543296 A | 12/2009 |
| JP | 2013051133 A | 3/2013 |
| JP | 2014092604 A | 5/2014 |
| JP | 2014529164 A | 10/2014 |

\* cited by examiner

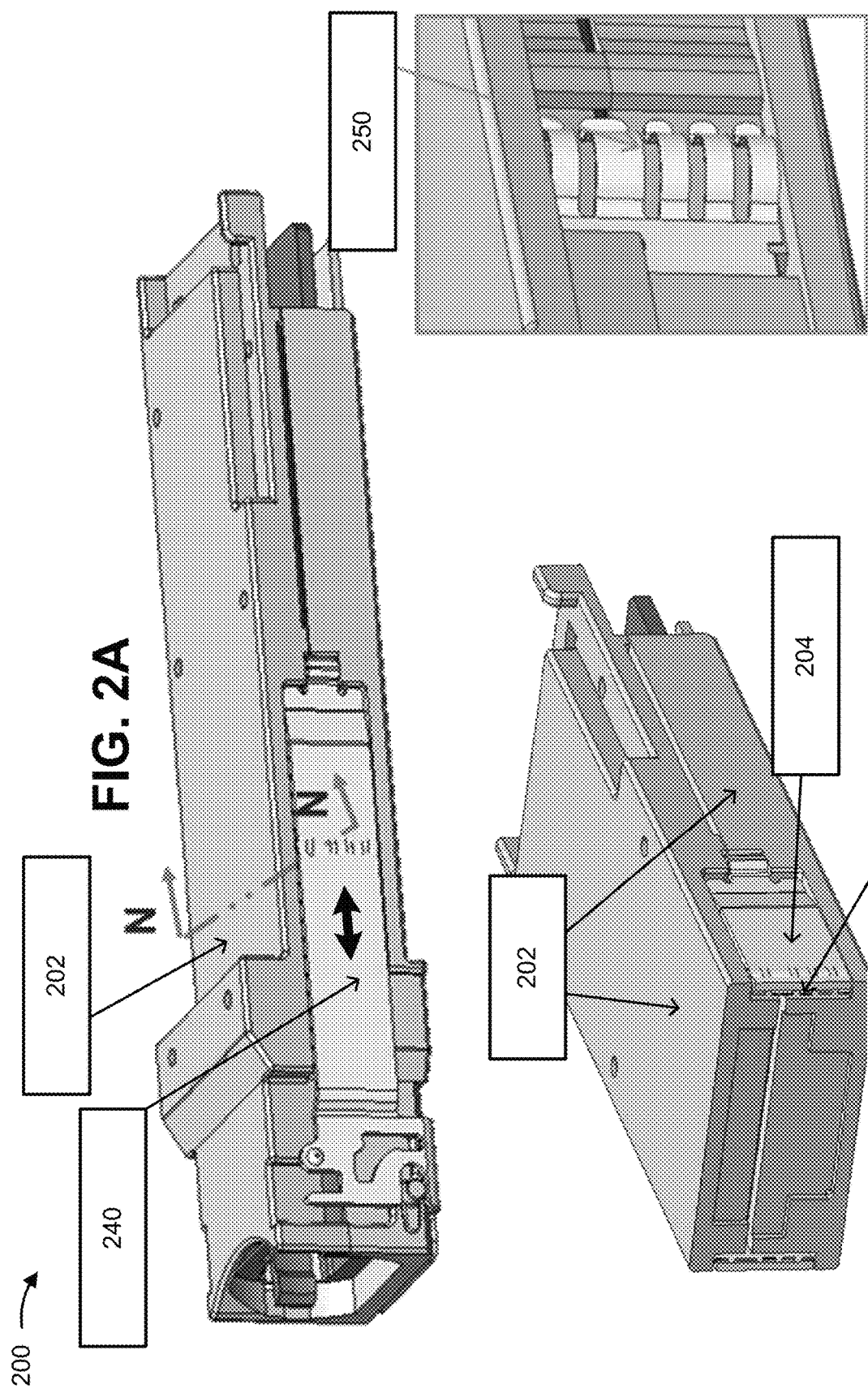

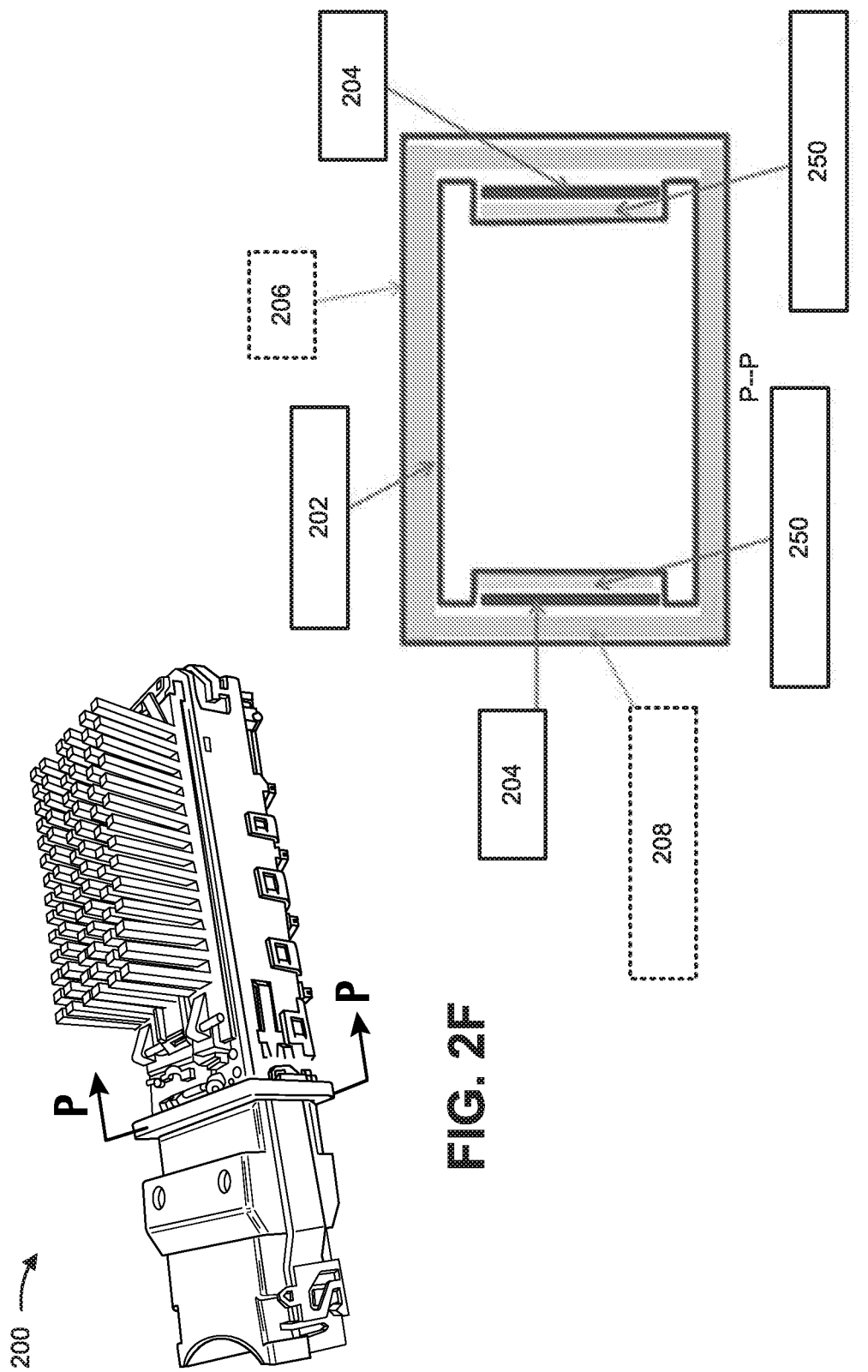

ELECTROMAGNETIC INTERFERENCE LEAKAGE REDUCTION FOR A PLUGGABLE OPTICAL MODULE

RELATED APPLICATION(S)

This application claims the benefit of priority to International Patent Application No. PCT/CN2018/097798, filed on Jul. 31, 2018, the content of which is incorporated by reference herein in its entirety.

TECHNICAL FIELD

The present disclosure relates to a pluggable optical module and, more particularly, to a pluggable optical module that includes an electromagnetic interference (EMI) shield to reduce leakage of EMI radiation through a gap between a housing of the pluggable optical module and a slider arm of the pluggable optical module.

BACKGROUND

A pluggable optical module includes a transducer in the form of a transmitter optical subassembly (TOSA) (e.g., an optical subassembly capable of converting an electrical signal, provided by a host system, into an optical signal for output to an optical fiber) and/or a transducer in the form of a receiver optical subassembly (ROSA) (e.g., an optical subassembly capable of converting an optical signal, received from an optical fiber, into an electrical signal for output to a host system). A pluggable optical module that includes both a TOSA and a ROSA may be referred to herein as a pluggable optical transceiver, a pluggable optical transceiver module, and/or the like.

A pluggable optical module further includes a circuit board, such as a printed circuit board (PCB), on which one or more electrical components are mounted. A given transducer of the pluggable optical module is electrically connected to a respective set of electronic components (e.g., an electronic circuit) mounted on the PCB. Generally, optical and electrical components of the pluggable optical module (e.g., a TOSA, a ROSA, a circuit board, and/or the like) are at least partially surrounded by a housing. The PCB typically includes an electrical edge connector designed to be mated with an electrical connector of a host system (e.g., in order to allow the pluggable optical module to communicate with the host system). Typically, the electrical connector of the host system is arranged in or near a cage of the host system, and the pluggable optical module is set in the cage in order to mate the edge connector of the PCB with the connector of the host system.

SUMMARY

According to some possible implementations, a pluggable optical module, may include: a housing enclosing one or more optical components and one or more electrical components; a slider to move along an exterior wall of the housing in association with latching or unlatching the pluggable optical module; and an electromagnetic interference (EMI) shield arranged in a gap between the slider and the exterior wall of the housing such that the EMI shield contacts the slider and the exterior wall of the housing, wherein the EMI shield is to reduce EMI radiation passing through the gap.

According to some possible implementations, an optical device may include: a housing at least partially surrounding one or more optical components and one or more electrical components; a latching mechanism associated with latching or unlatching the optical device, wherein the latching mechanism comprises a slider to slide along a wall of the housing; and an EMI shield, arranged in a gap between the slider and the wall of the housing, to at least partially prevent EMI radiation from passing through the gap, wherein the EMI shield contacts both the slider and the wall of the housing.

According to some possible implementations, a pluggable device may include: a housing that at least partially surrounds a set of optical components and a set of electrical components; at least one slider to move along an exterior wall of the housing in association with selectively latching the pluggable device to a cage; and at least one EMI shield arranged in a gap between the at least one slider and the exterior wall, wherein the at least one EMI shield contacts the at least one slider and the exterior wall in association with at least partially preventing EMI radiation from passing through the gap.

BRIEF DESCRIPTION OF THE DRAWINGS

FIGS. 2A-2G are diagrams of an improved pluggable optical module that at least partially prevents EMI radiation from passing through a gap between a housing of the pluggable optical module and a slider of the pluggable optical module, as described herein.

DETAILED DESCRIPTION

The following detailed description of example implementations refers to the accompanying drawings. The same reference numbers in different drawings may identify the same or similar elements.

As described above, a pluggable optical module (e.g., a pluggable optical transceiver, a pluggable optical receiver, a pluggable optical transmitter, and/or the like) may be set in a cage of a host system in order to connect the pluggable optical module to the host system.

Typically, the pluggable optical module and/or the cage includes a latching mechanism designed to latch the pluggable optical module in the cage in order to, for example, prevent the pluggable optical module from being unintentionally removed from (i.e., pulled out of) the cage, prevent the pluggable optical module from moving or shifting within the cage, and/or the like. In many cases, such a latching mechanism includes at least one slider arm (herein referred to as slider) that slides along an exterior wall of a housing of the pluggable optical module in association with latching the pluggable optical module in the cage (e.g., engaging the pluggable optical module with the cage such that the pluggable optical module cannot be removed from the cage) or unlatching the pluggable optical module from the cage (e.g., disengaging the pluggable optical module from the cage such that the pluggable optical module can be removed from the cage). Such a latching mechanism may include, for example, a pull-tab latching mechanism, a bail latching mechanism, and/or the like. In such latching mechanisms, the slider slides along the exterior wall of the housing and, as such, must be separated from the exterior wall of the housing. As a consequence, a gap is present between the exterior wall of the housing and the slider in a given latching mechanism that employs a slider.

Figure 1A:
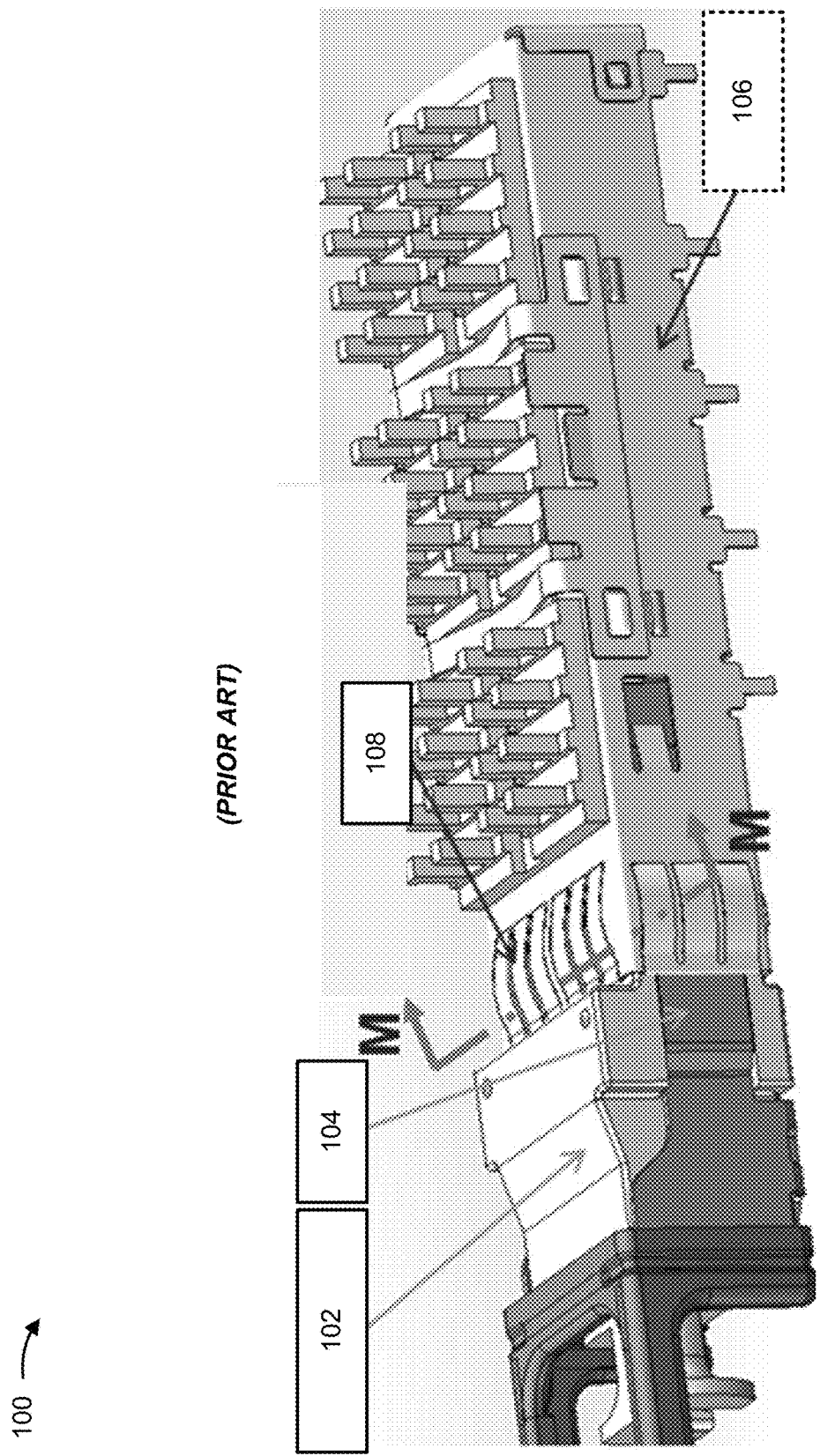
FIGS. 1A and 1B are diagrams of a prior art pluggable optical module.
Figure 1B:
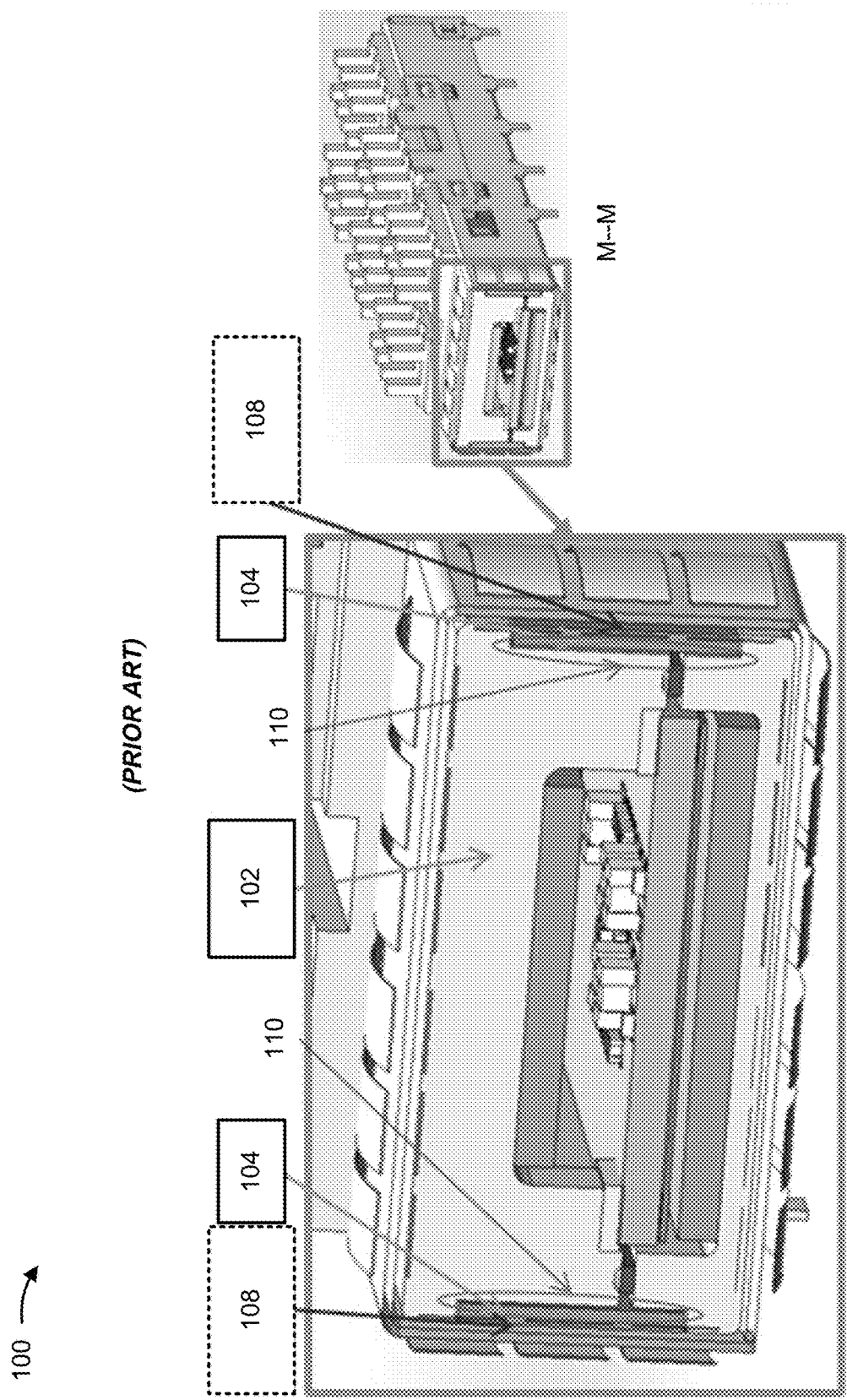

FIGS. 1A and 1B are diagrams of a prior art pluggable optical module 100 with a latching mechanism that includes a slider 104 arranged to slide along an exterior wall of a housing 102. The latching mechanism of prior art pluggable optical module 100 is an example of a pull-tab latching mechanism. In prior art pluggable optical module 100, the slider 104 is arranged to slide along an exterior sidewall of the housing 102 (e.g., from left to right in a recessed channel on the exterior sidewall of the housing 102).

As further shown in FIG. 1A, a cage 106, associated with a host system and in which prior art pluggable optical module 100 is inserted, includes EMI spring fingers 108 arranged around the cage 106 (e.g., on exterior walls of the cage 106 and/or on interior walls of the cage 106 (not shown)). The EMI spring fingers 108 of the cage 106 are in contact with the housing 102 of prior art pluggable optical module 100 while prior art pluggable optical module 100 is set in the cage 106. The EMI spring fingers 108 may reduce an amount of EMI radiation that passes through a space between the cage 106 and the housing 102 of prior art pluggable optical module 100 (e.g., from a back (right, or electrical) end of prior art pluggable optical module 100 toward a front (left, or optical) end of prior art pluggable optical module 100).

FIG. 1B is a cross sectional view of prior art pluggable optical module 100 at line M—M as illustrated in FIG. 1A. As shown in FIG. 1B, and as noted above, a gap 110 (e.g. a physical gap, a void, a region filled with air or ambient atmosphere) is present between the slider 104 of prior art pluggable optical module 100 and the housing 102 of prior art pluggable optical module 100 when prior art pluggable optical module 100 is set in the cage 106. A gap 110 is present because the slider 104 is separated from the housing 102 in order to allow the slider 104 to slide along the exterior wall of the housing 102. Since a gap 110 is present along the length and width of the slider 104 arm, the gap 110 may be of a significant size and, therefore, may allow a significant amount of EMI radiation to pass through toward the front of prior art pluggable optical module 100. Notably, while the EMI spring fingers 108 of the cage 106 may reduce an amount of EMI radiation passing through the space between the cage 106 of the host system and the housing 102 of prior art pluggable optical module 100, the EMI spring fingers 108 do not prevent EMI radiation from passing through the gap 110 between the slider 104 of prior art pluggable optical module 100 and the housing 102 of prior art pluggable optical module 100. Thus, due to the configuration of the slider 104, an undesirable amount of EMI radiation may be allowed to pass through the gap 110 between the slider 104 and the housing 102 uninhibited.

Some implementations described herein provide a pluggable optical module that includes an EMI shield arranged in a gap between a slider of the pluggable optical module and a housing of the pluggable optical module in order to reduce EMI radiation passing through the gap between the slider of the pluggable optical module and the housing of the pluggable optical module. In this way, an amount of EMI radiation that leaks toward a front end of the pluggable optical module may be reduced (e.g., as compared to prior art pluggable optical module 100 described above).

FIGS. 2A-2G are diagrams associated with an improved pluggable optical module 200 (herein referred to as pluggable optical module 200) that at least partially prevents EMI radiation from passing through a gap between a housing 202 of pluggable optical module 200 and a slider 204 of pluggable optical module 200. Thus, pluggable optical module 200 reduces an amount of EMI radiation passing through a gap between a housing 202 and a slider 204 (e.g., as compared to prior art pluggable optical module 100 described above).

FIG. 2A shows an example isometric view of pluggable optical module 200. As shown in FIG. 2A, pluggable optical module 200 may include a housing 202 that encloses or at least partially surrounds one or more optical components and/or one or more electrical components of pluggable optical module 200. As further shown, pluggable optical module 200 may include a slider 204 associated with latching or unlatching pluggable optical module 200 (e.g., to or from a cage 206 of a host system). As described above, the slider 204 may be a component of a latching mechanism that provides this selective latching functionality. As indicated by the double-sided arrow in FIG. 2A, the slider 204 may be arranged to move along (e.g., slide along) an exterior wall of the housing 202 (e.g., in a recessed channel on the exterior sidewall of the housing 202).

Notably, in pluggable optical module 200, the latching mechanism comprises a pair of sliders 204, each arranged to slide along respective exterior sidewalls of the housing 202 (e.g., only one slider 204 is visible in FIG. 2A). However, in some implementations, the latching mechanism may comprise one or more sliders 204 in another arrangement and/or a different number of sliders 204 than shown in association with pluggable optical module 200.

FIG. 2B shows an isometric view of an example cross section of pluggable optical module 200 at line N—N identified in FIG. 2A. As shown in FIG. 2B, pluggable optical module 200 includes an electromagnetic interference (EMI) shield arranged in a gap between the slider 204 and the exterior wall of the housing 202 (e.g., an exterior wall formed by a top section of the housing 202 and bottom section of the housing 202) such that the EMI shield 250 contacts the slider 204 and the exterior wall of the housing 202 (e.g., at multiple contact points). By providing contact between the slider 204 and the housing 202, the EMI shield 250 at least partially prevents EMI radiation (e.g., propagating from a back (right) end of pluggable optical module 200 toward a front (left) end of pluggable optical module 200 in FIGS. 2A and 2B) from passing through the gap between the slider 204 and the housing 202.

Notably, while the EMI shield 250, as shown in FIGS. 2A and 2B and embodied as a plurality of metallic spring fingers, appears to be passing through and partially protruding from the slider 204, this is not the case in practice. Rather, the size of the EMI shield 250 may be greater than the size of the gap such that the computer-assisted drawing suggests that the EMI shield 250 and the slider 204 appear to occupy the same physical area. Instead, the EMI shield 250 contacts a surface of the slider 204 that is proximal to the wall of the housing 202 (e.g., at an inner surface of the slider 204 that is closest to the housing 202) which may create pressure, friction, flex or the like on the EMI shield 250 between the slider 204 and the housing 202. Such pressure, friction, flex or the like may improve contact (e.g. elastic contact) between the EMI shield 250, the slider 204 and the housing 202. The appearance of partial protrusion in FIGS. 2A and 2B is meant to illustrate that the EMI shield 250 is in contact with the slider 204 at multiple points across a width of the slider 204. For greater clarity, FIGS. 2A and 2B are not meant to illustrate that the EMI shield 250 will pass through or protrude from the slider 204.

Figure 2D:
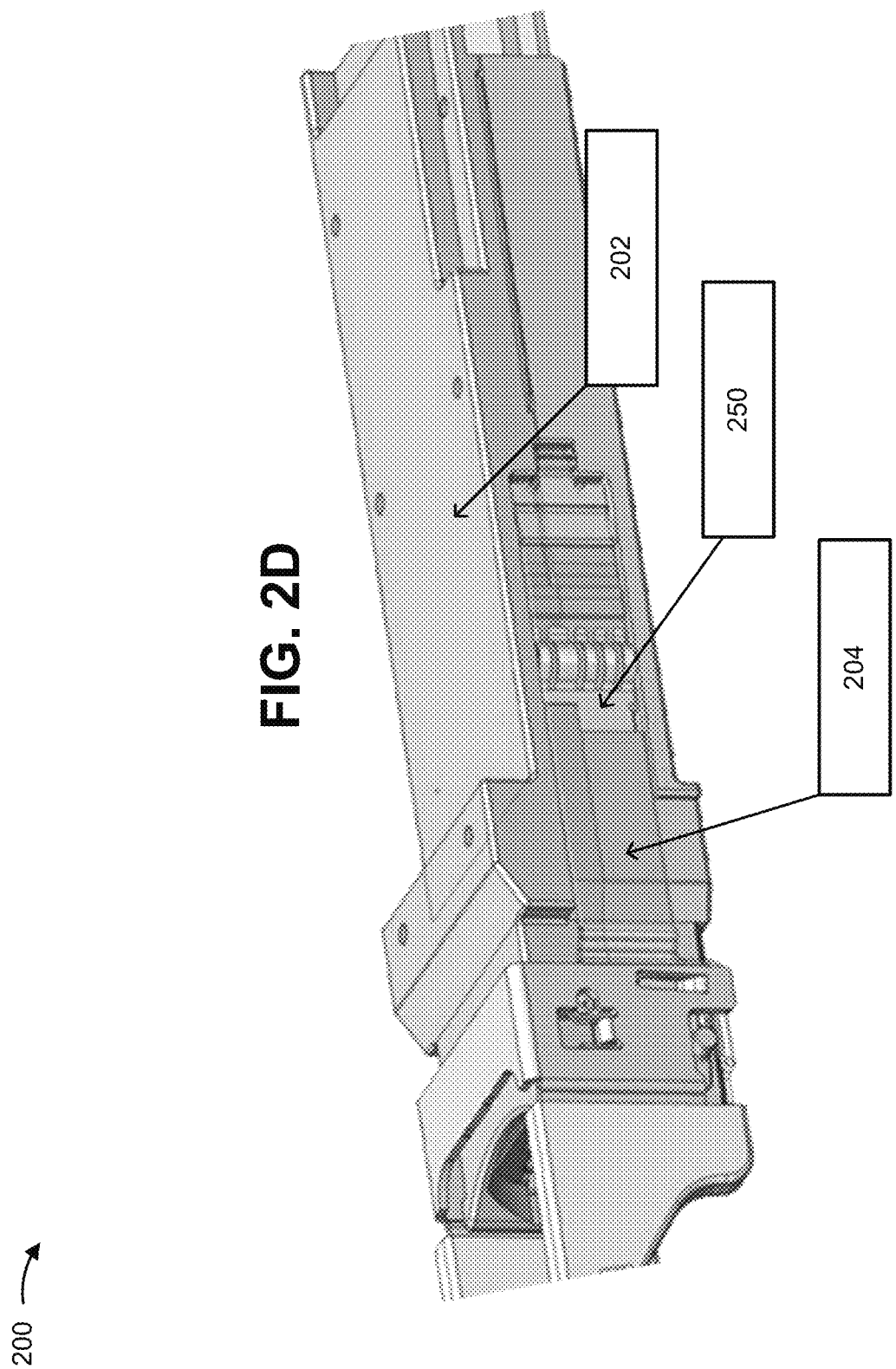

The EMI shield 250 comprises a conductive material, such as a metal. The EMI shield 250 may take the form of, for example, a spring (e.g., as illustrated in pluggable optical module 200) a foam, a fabric, and/or the like. As a particular example, as shown with respect to pluggable optical module 200, the EMI shield 250 may include a a sheet metal spring that includes a plurality of spring fingers. FIG. 2C shows an example close-up view of an EMI shield 250 in the form of a spring including a plurality of spring fingers. For purposes of clarity, the slider 204 is not shown in FIG. 2C. In the arrangement shown in FIG. 2C, the ends of the spring fingers contact the housing 202, while midsections of the spring fingers (e.g., within arched sections of the spring fingers) are to contact the slider 204. A shape of the spring fingers shown in association with pluggable optical module 200 is provided as an example, and spring fingers having other shapes are possible. FIG. 2D shows a view similar to that of FIG. 2B, with the slider 204 being represented as transparent in order to illustrate the arrangement and the location of the EMI shield 250.

The EMI shield 250 comprises a separation between portions of the EMI shield 250 which may work like a filter screen to reduce EMI radiation. In some implementations, the separation may be provided between each of the spring fingers, within a conductive foam, or between fibers or filaments of a conductive fabric. In some implementations, a separation may be selected to reduce EMI radiation at a frequency associated with a line rate of pluggable optical module 200 or at a frequency (e.g. a peak frequency) associated with the EMI radiation. As line rates of optical pluggable modules increase, the desire to reduce EMI radiation has increased. Often, the frequencies of EMI radiation which require reduction are around the same frequencies associated with a line rate of the optical pluggable module. For example, the widths of spring fingers of an EMI shield 250 may be selected such that separation between the spring fingers is provided (e.g., small enough) to at least partially prevent EMI radiation around a frequency, associated with a line rate of pluggable optical module 200, from passing through the EMI shield 250. In some implementations, reducing higher frequency EMI radiation may require greater density of the EMI shield 250, in other words, smaller separation. In some implementations attempting to reduce high frequency EMI radiation, smaller separation may be provided more effectively by an EMI shield 250 comprising conductive foam or conductive fiber rather than spring fingers.

Notably, while pluggable optical module 200 is illustrated as including an EMI shield 250 comprising a metal in the form of a spring including a plurality of fingers, other types of EMI shield 250s are possible, as noted above. Generally, the EMI shield 250 may include a conductive material in any form that can be placed or otherwise arranged in the gap between the housing 202 and the slider 204 such that the EMI shield 250 contacts the slider 204 and the housing 202. For example, the EMI shield 250 may include a conductive material in the form of a foam, a fabric, a tape, and/or the like.

Figure 2E:
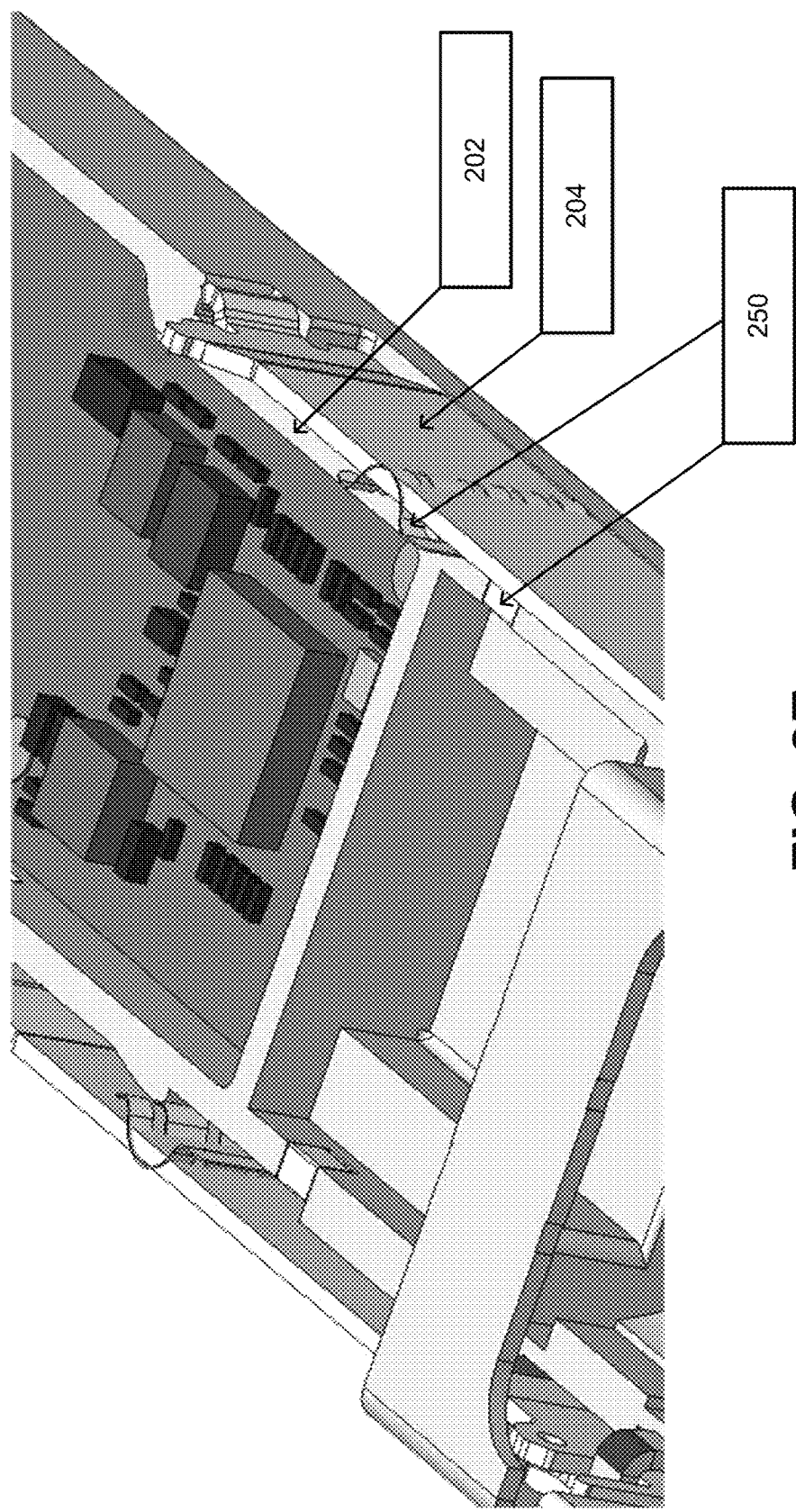

In implementations in which the EMI shield 250 is a spring, the EMI shield 250 may be clipped to a portion of the housing 202 of pluggable optical module 200, in some implementations. FIG. 2E is an isometric view illustrating a manner in which the EMI shield 250 may be clipped to the housing 202. In FIG. 2E, a top section of the housing 202 is not shown. As shown, a clip portion of the EMI shield 250 may be arranged in a pocket or a recess formed in the wall of the housing 202 (e.g., the pocket extends in a downward direction in FIG. 2E). In this example, the spring fingers of the EMI shield 250 extend perpendicularly from the clip portion along a length of the clip portion (e.g., in an upward-right direction in FIG. 2E). In some implementations, the EMI shield 250 may be clipped to a bottom section of the housing 202 only (e.g., as shown in FIG. 2E), a top section of the housing 202 only, or to both the bottom section of the housing 202 and the top section of the housing 202.

In some implementations, the EMI shield 250 may be clipped to the housing 202, as described above. Additionally, or alternatively, the EMI shield 250 may be affixed to the housing 202 in another manner, such as by an epoxy, a solder, a weld, and/or the like. In general, when the EMI shield 250 is clipped or affixed to the housing 202, the EMI shield 250 is not clipped or affixed to the slider 204 (e.g., in order to allow the slider 204 to slide along the exterior wall of the housing 202).

In some implementations, rather than being affixed to the housing 202, the EMI shield 250 may be clipped or otherwise affixed to the slider 204 (e.g., by an epoxy, a solder, a weld, and/or the like). In such a case, the EMI shield 250 is not clipped or affixed to the housing 202 (e.g., in order to allow the slider 204 to slide along the exterior wall of the housing 202).

In some implementations, the EMI shield 250 may comprise a metallic material formed into a plurality of spring fingers, as described above, which may improve manufacturability of pluggable optical module 200 and/or improve an operational lifetime of pluggable optical module 200 (e.g., as compared to an EMI shield 250 of conductive foam or conductive fabric).

In some implementations, the EMI shield 250 may be positioned along a length of pluggable optical module 200 such that, when pluggable optical module 200 is inserted into a cage 206, the EMI shield 250 is aligned with or located near EMI spring fingers 208 of the cage 206. FIGS. 2F and 2G show an example of pluggable optical module 200 in which the EMI shield 250 is positioned such that, when set in a cage 206, the EMI shield 250 is aligned with EMI spring fingers 208 of the cage 206. FIG. 2F is a photograph of pluggable optical module 200 set in a cage 206, and FIG. 2G is an example cross section at line P—P of FIG. 2F. In some implementations, such an arrangement may provide improved reduction of EMI leakage through the gaps of pluggable optical module 200 (e.g., a gap between the housing 202 and the slider 204, a space between the cage 206 and the housing 202) as compared to an arrangement in which the EMI shield 250 is not aligned or near the EMI spring fingers 208 of the cage 206.

FIG. 2G shows an example cross-section of pluggable optical module 200 where EMI shield 250 may be a conductive foam or a conductive fabric.

The number and arrangement of components of pluggable optical module 200 shown in FIGS. 2A-2G are provided as an example. In practice, there may be additional components, fewer components, different components, differently arranged components, differently sized components, components with different relative sizes, and/or the like, than those shown in any of FIGS. 2A-2G. For example, while pluggable optical module 200 is illustrated as including a pull-tab latching mechanism in FIGS. 2A-G, in some implementations, pluggable optical module 200 may employ another type of latching mechanism that includes at least on slider 204, such as a bail latching mechanism.

Some implementations described herein provide pluggable optical module 200 that includes an EMI shield 250 arranged in a gap between a slider 204 of pluggable optical module 200 and a housing 202 of pluggable optical module 200 in order to reduce EMI radiation passing through the gap between the slider 204 and the housing 202. In this way, an amount of EMI radiation that passes through the gap may be reduced (e.g., as compared to prior art pluggable optical module 100).

In some implementations the pluggable optical module 200 may be provided in different form factors, such as CFP, CFP2, XFP, SFP28, OSPF, QSFP, QSFP28, QSFP-DD, or another type of pluggable optical module. In some implementations, the pluggable optical module 200 may be associated with different data rates such as, but not limited to, 10 G, 25 G, 40 G, 100 G, 200 G, or 400 G. In some implementations, the pluggable optical module 200 may be associated with different line rates such as, 25 Gbps, 28 Gbps, 32 Gbps, 40 Gbps, 42 Gbps, 100 Gbps or another line rate.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A pluggable optical module, comprising:
a housing enclosing one or more optical components and one or more electrical components;
a slider to move along an exterior wall of the housing in association with latching or unlatching the pluggable optical module; and
an electromagnetic interference (EMI) shield contained in a gap between the slider and the exterior wall of the housing such that the EMI shield creates pressure, friction, or flex between the slider and the exterior wall of the housing,
wherein a width of the EMI shield is larger than a width of the gap when the EMI shield is not contained in the gap,
the width of the EMI shield being perpendicular to a surface of the EMI shield that is in contact with the slider when the EMI shield is contained in the gap, and
the width of the gap being a distance between the slider and the exterior wall of the housing, and
wherein the EMI shield is to reduce EMI radiation passing through the gap.

2. The pluggable optical module of claim 1, wherein the EMI shield comprises a metallic spring including a plurality of spring fingers.

3. The pluggable optical module of claim 2, wherein widths of spring fingers, of the plurality of spring fingers, are selected to reduce the EMI radiation at a frequency associated with a line rate of the pluggable optical module.

4. The pluggable optical module of claim 1, wherein the EMI shield comprises a conductive foam.

5. The pluggable optical module of claim 1, wherein the EMI shield comprises a conductive fabric.

6. The pluggable optical module of claim 1, wherein the EMI shield is clipped to a portion of the housing.

7. The pluggable optical module of claim 1, wherein the EMI shield is affixed to the housing by an epoxy, a solder, or a weld.

8. The pluggable optical module of claim 1, wherein the EMI shield is attached to the slider.

9. The pluggable optical module of claim 1, wherein the EMI shield is positioned along a length of the pluggable optical module such that, when the pluggable optical module is inserted into a cage, the EMI shield is aligned with EMI spring fingers of the cage.

10. An optical device, comprising:
a housing at least partially surrounding one or more optical components and one or more electrical components;
a latching mechanism associated with latching or unlatching the optical device,
wherein the latching mechanism comprises a slider to slide along a wall of the housing; and
an electromagnetic interference (EMI) shield, contained in a gap between the slider and the wall of the housing, to at least partially prevent EMI radiation from passing through the gap,
wherein the EMI shield creates pressure, friction, or flex between the slider and the wall of the housing, and
wherein a width of the EMI shield is larger than a width of the gap when the EMI shield is not contained in the gap,
the width of the EMI shield being perpendicular to a surface of the EMI shield that is in contact with the slider when the EMI shield is contained in the gap, and
the width of the gap being a distance between the slider and the wall of the housing.

11. The optical device of claim 10, wherein the EMI shield comprises a metallic spring including a plurality of spring fingers, and
wherein widths of each of the plurality of spring fingers are selected based on a frequency associated with the EMI radiation.

12. The optical device of claim 10, wherein the EMI shield comprises a conductive foam.

13. The optical device of claim 10, wherein the EMI shield comprises a conductive fabric.

14. The optical device of claim 10, wherein the EMI shield is clipped to a portion of the housing.

15. The optical device of claim 10, wherein the EMI shield is affixed to one of the housing or the slider by an epoxy, a solder, or a weld.

16. The optical device of claim 10, wherein the EMI shield is positioned along a length of the optical device such that, when the optical device is inserted into a cage, the EMI shield is aligned with EMI spring fingers of the cage.

17. A pluggable device, comprising:
a housing that at least partially surrounds a set of optical components and a set of electrical components;
at least one slider to move along an exterior wall of the housing in association with selectively latching the pluggable device to a cage; and
at least one electromagnetic interference (EMI) shield arranged in a gap between the at least one slider and the exterior wall,
wherein the at least one EMI shield creates pressure, friction, or flex between the at least one slider and the exterior wall in association with at least partially preventing EMI radiation from passing through the gap, and
wherein a width of the at least one EMI shield is larger than a width of the gap when the at least one EMI shield is not contained in the gap,
the width of the at least one EMI shield being perpendicular to a surface of the at least one EMI shield that is in contact with the slider when the at least one EMI shield is contained in the gap, and
the width of the gap being a distance between the slider and the exterior wall.

18. The pluggable device of claim 17, wherein the at least one EMI shield comprises:
a metallic spring including a plurality of spring fingers,
a conductive foam, or
a conductive fabric.

19. The pluggable device of claim 17, wherein the at least one EMI shield is clipped to a portion of the housing.

20. The pluggable device of claim 17, wherein the at least one EMI shield is positioned along a length of the pluggable device such that, when the pluggable device is inserted into the cage, the at least one EMI shield is aligned with EMI spring fingers of the cage.

* * * * *